United States Patent [19]
Milne, III

[11] Patent Number: 5,697,637
[45] Date of Patent: Dec. 16, 1997

[54] VEHICLE OCCUPANT PROTECTION APPARATUS

[75] Inventor: Kenneth T. Milne, III, Gilbert, Ariz.

[73] Assignee: TRW Inc., Lyndhurst, Ohio

[21] Appl. No.: 611,398

[22] Filed: Mar. 5, 1996

[51] Int. Cl.$^6$ .................................................. B60R 21/16
[52] U.S. Cl. ........................................ 280/728.2; 280/731
[58] Field of Search ............................ 280/728.2, 731, 280/732

[56] References Cited

U.S. PATENT DOCUMENTS

| | | | |
|---|---|---|---|
| 3,887,215 | 6/1975 | Albrecht et al. | 280/730.1 |
| 4,325,568 | 4/1982 | Clark et al. | 280/731 |
| 4,913,461 | 4/1990 | Cuevas | 280/731 |
| 4,915,410 | 4/1990 | Bachelder | 280/732 |
| 4,943,027 | 7/1990 | Nakayama | 248/548 |
| 4,988,119 | 1/1991 | Hartmeyer | 280/728.2 |
| 5,141,247 | 8/1992 | Barth | 280/728.2 |
| 5,184,843 | 2/1993 | Berger et al. | 280/728.2 |
| 5,275,431 | 1/1994 | Stephens | 280/728.2 |
| 5,518,266 | 5/1996 | O'Docherty et al. | 280/728.2 |
| 5,529,332 | 6/1996 | Wipasuramonton | 280/728.2 |

*Primary Examiner*—Kenneth R. Rice
*Attorney, Agent, or Firm*—Tarolli, Sundheim, Covell, Tummino & Szabo

[57] ABSTRACT

A vehicle occupant protection apparatus (10) includes an inflatable vehicle occupant protection device, such as an air bag (14), an inflator (12), a reaction plate (70), and a retainer (100). The reaction plate (70) has first and second support surfaces (74 and 84) which are spaced from each other. The retainer (100) holds the air bag (14) and a mounting part (64) of the inflator (12) against the reaction plate (70) with a clamping force. The retainer (100) has a first clamping surface (104) for holding the air bag (14) against the first support surface (74) on the reaction plate (70). The retainer (100) further has a second clamping surface (128) for holding the mounting part (64) of the inflator (12) against the second support surface (84) on the reaction plate (70). Additionally, the retainer (100) includes spring structures (120) which flex to permit the first and second clamping surfaces (104 and 128) to move toward each other under the influence of the clamping force upon the application of the clamping force.

22 Claims, 5 Drawing Sheets

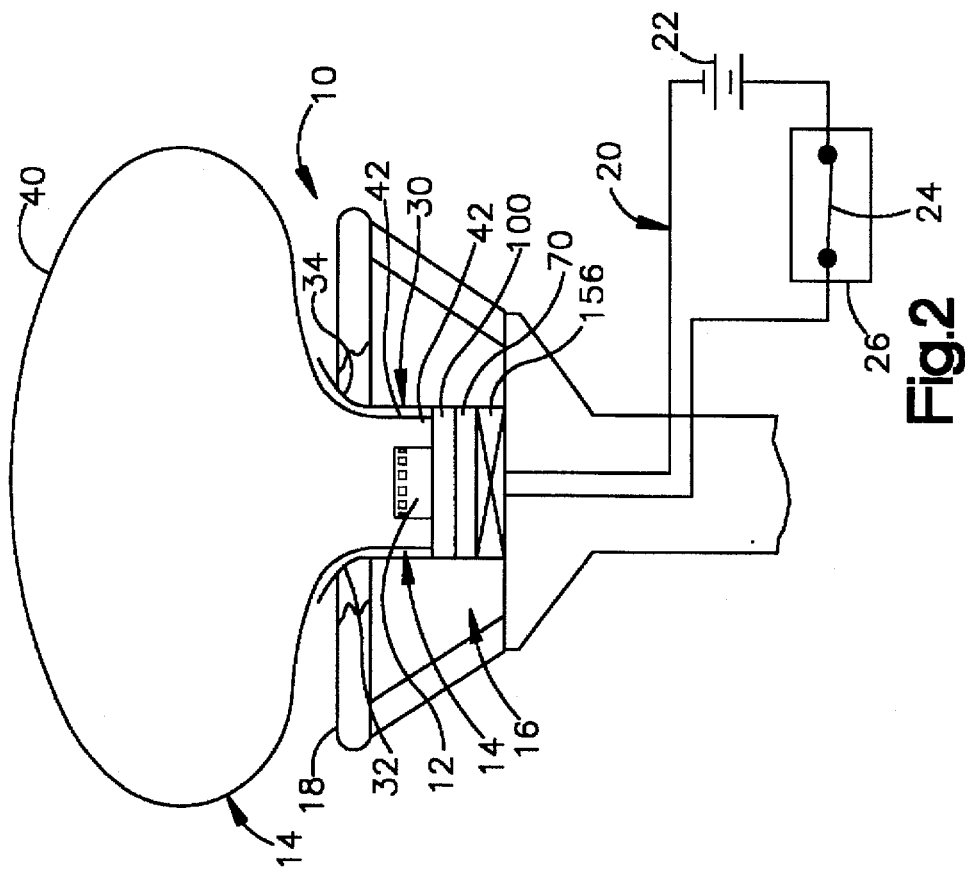
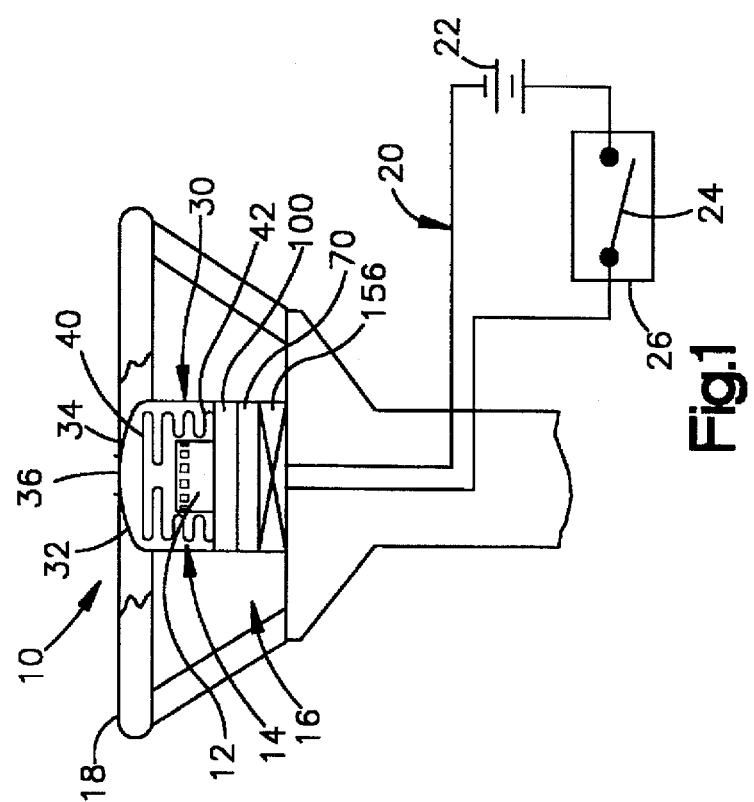

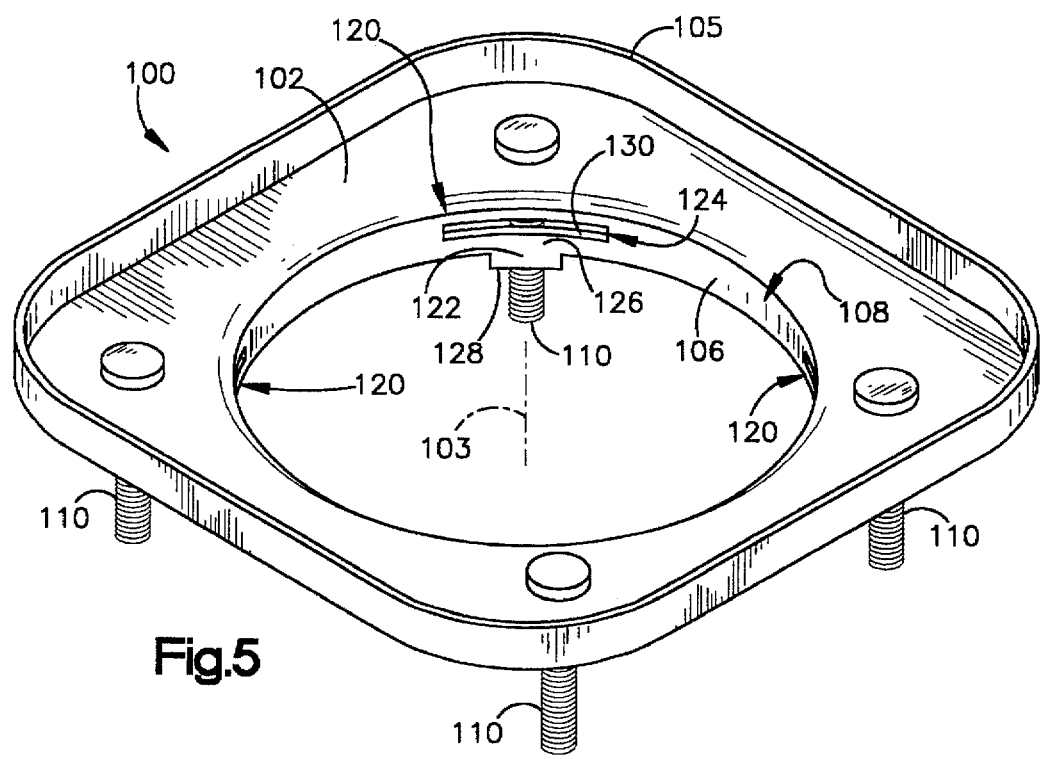
Fig.5
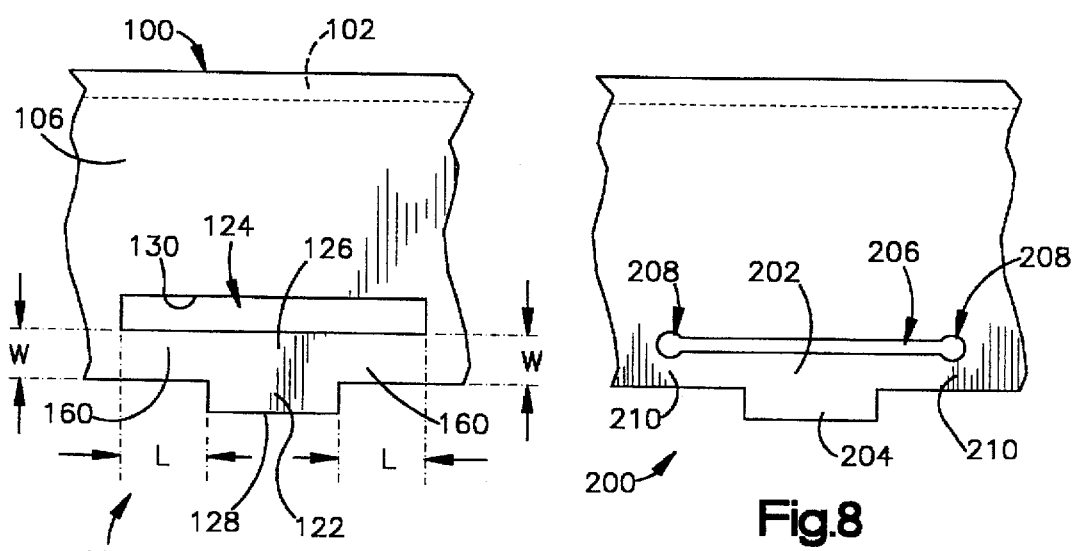
Fig.7
Fig.8

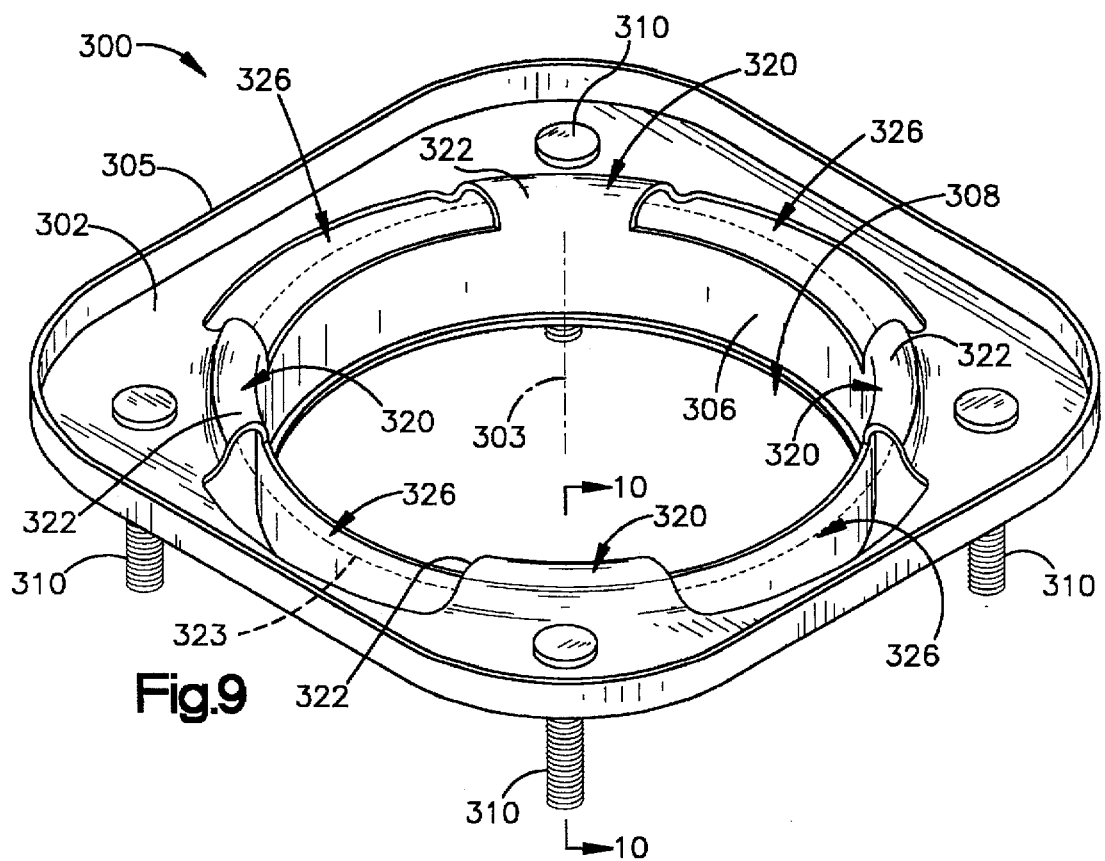
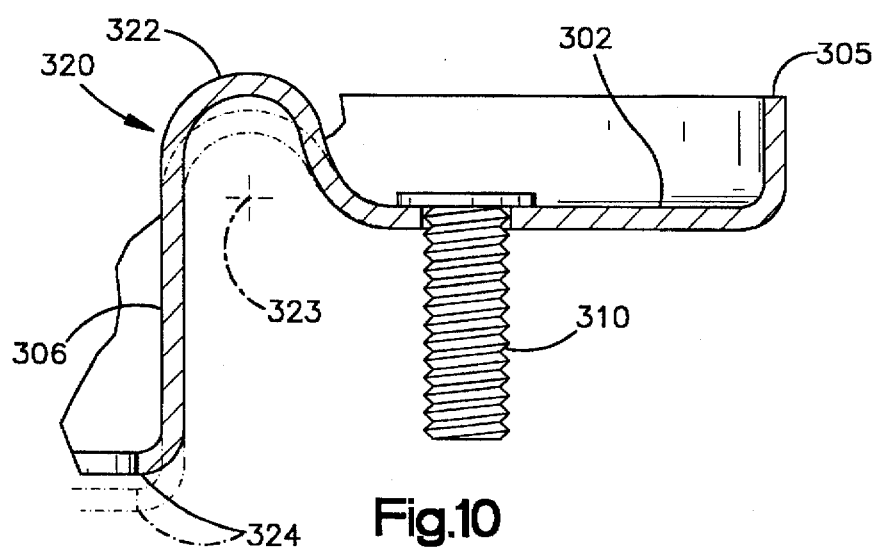

VEHICLE OCCUPANT PROTECTION APPARATUS

FIELD OF THE INVENTION

The present invention relates to an apparatus for protecting an occupant of a vehicle, and particularly relates to an apparatus including an inflatable vehicle occupant protection device.

BACKGROUND OF THE INVENTION

An inflatable vehicle occupant protection device, such as an air bag, is inflated upon the occurrence of a vehicle collision. The air bag is part of an apparatus which further includes a collision sensor and an inflator. The collision sensor senses vehicle conditions that indicate the occurrence of a collision. When the collision sensor senses a collision-indicating condition of at least a predetermined threshold level, the inflator is actuated. The inflator then emits inflation fluid which inflates the air bag into the vehicle occupant compartment to help protect an occupant of the vehicle from forcefully striking, or being struck by, parts of the vehicle as a result of the collision.

An air bag and an inflator are typically assembled together as parts of an air bag module which is separate from the collision sensor. The air bag module is located in the vehicle adjacent to the vehicle occupant compartment. For example, a passenger side air bag module is typically located in the vehicle instrument panel. A driver's side air bag module is typically located on the vehicle steering column. In addition to the air bag and the inflator, a driver's side air bag module typically includes a retainer and a cover. The retainer holds the air bag and the inflator together within the module. The cover conceals the other parts of the module from the vehicle occupant compartment, and includes at least one pivotal deployment door which extends directly over the air bag.

When the inflation fluid emitted from the inflator begins to inflate the air bag, it moves the air bag forcefully outward against the deployment door on the cover. The deployment door is ruptured by the force of the fluid pressure in the air bag, and is moved pivotally out of the path of the air bag as the inflation fluid continues to inflate the air bag outward into the vehicle occupant compartment.

SUMMARY OF THE INVENTION

In accordance with the present invention, a vehicle occupant protection apparatus comprises an inflatable vehicle occupant protection device, an inflator, a support structure, and a clamping means. The support structure has first and second support surfaces which are spaced from each other. The clamping means holds the protection device and the inflator against the support structure with a clamping force.

The clamping means has a first clamping surface for holding the protection device against the first support surface on the support structure. The clamping means further has a second clamping surface for holding a mounting part of the inflator against the second support surface on the support structure. Additionally, the clamping means comprises spring means for flexing to permit the first and second clamping surfaces to move toward each other under the influence of the clamping force upon the application of the clamping force.

In the preferred embodiments of the present invention, the clamping means comprises a retainer and a plurality of fasteners for fastening the retainer to the support structure. The retainer is a unitary, stamped metal part which includes the first clamping surface, the second clamping surface, and the spring means. The mounting part of the inflator is a flange projecting radially from a cylindrical inflator housing. The support structure is a reaction plate, with the first and second support surfaces being spaced from each along the axis of the inflator housing. The retainer extends circumferentially around the inflator housing, and the first and second clamping surfaces also are spaced from each other along the axis of the inflator housing.

Preferably, the spring means comprises a plurality of spring structures which are spaced from each other circumferentially about the axis of the inflator housing. In a first embodiment of the invention, each spring structure comprises a flexible portion of the retainer which moves across an adjacent slot upon flexing under the influence of the clamping force. In a second embodiment, each spring structure comprises a flexible portion of the retainer with a cross-sectional configuration extending in an arc around a circular line which is centered on the axis of the inflator housing.

BRIEF DESCRIPTION OF THE DRAWINGS

Further features of the present invention will become apparent to those skilled in the art to which the present invention relates from reading the following description with reference to the accompanying drawings, in which:

FIG. 1 is a schematic view of a vehicle occupant protection apparatus comprising a first embodiment of the present invention;

FIG. 2 is a view showing the apparatus of FIG. 1 in an actuated condition;

FIG. 5 is a perspective view of another part of the apparatus of FIG. 1;

FIG. 7 is a partial view of a part shown in FIG. 6;

FIG. 8 is a partial view of a part of a vehicle occupant protection apparatus comprising a second embodiment of the present invention;

FIG. 9 is a perspective view of a part of a vehicle occupant protection apparatus comprising a third embodiment of the present invention; and FIG. 10 is a view taken on line 10—10 of FIG. 9.

DESCRIPTION OF PREFERRED EMBODIMENTS

Figure 3:
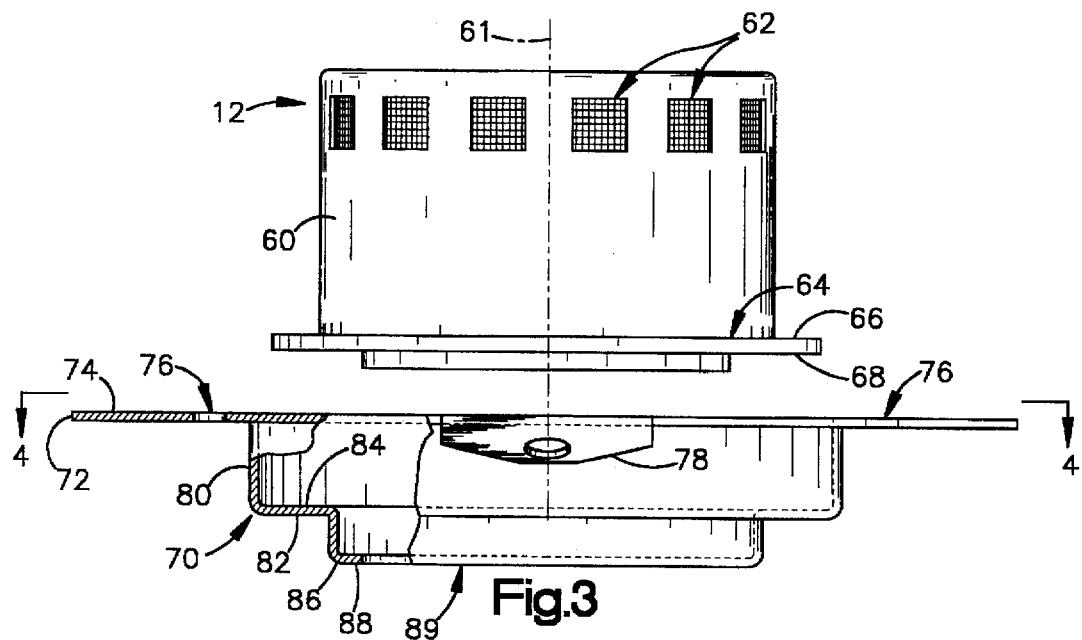
FIG. 3 is an exploded side view of parts of the apparatus of FIG. 1.

A vehicle occupant protection apparatus 10 comprising a first embodiment of the present invention is shown schematically in FIGS. 1 and 2. The apparatus 10 includes an inflator 12 and a particular type of inflatable vehicle occupant protection device 14 which is commonly referred to as an air bag. The air bag 14 and the inflator 12 are parts of an air bag module 16 which is mounted on a vehicle steering wheel 18.

The air bag 14 is inflatable from a folded, uninflated condition, as shown in FIG. 1, to an unfolded, inflated condition, as shown in FIG. 2. When the air bag 14 is being inflated, it moves toward the driver of the vehicle. The air bag 14 then restrains movement of the driver toward the steering wheel 18 to help protect the driver from a forceful impact with the steering wheel 18 or other parts of the vehicle.

The inflator 12 is an electrically actuatable source of inflation fluid for inflating the air bag 14. In the preferred embodiments of the present invention, the inflator 12 contains an ignitable gas generating material which, when ignited, generates a large volume of inflation gas. The inflator 12 may alternatively contain a stored quantity of pressurized inflation fluid, or a combination of pressurized inflation fluid and ignitable material for heating the inflation fluid. Further, the inflator 12 could alternatively be mechanically actuated.

When the air bag module 16 is installed on the steering wheel 18, the inflator 12 is included in an electrical circuit 20 with a power source 22 and a normally open switch 24. The power source 22 is preferably the vehicle battery. The switch 24 is part of a sensor 26 which senses a condition indicating the occurrence of a vehicle collision. Such a condition may comprise, for example, sudden vehicle deceleration caused by a collision. If the collision-indicating condition is at or above a predetermined threshold level, it indicates the occurrence of a collision having at least a predetermined threshold level of severity. The threshold level of collision severity is a level at which inflation of the air bag 14 is desired to restrain movement of the driver of the vehicle, as described above. The switch 24 then closes, and electric current is directed through the inflator 12 to actuate the inflator 12. As a result, the inflator 12 rapidly emits a large volume of inflation gas which flows into the air bag 14 to inflate the air bag 14.

Another part of the air bag module 16 is a cover 30 which encloses the air bag 14 and the inflator 12. The cover 30 is made of a pliable plastic material which may have any suitable composition known in the art. The cover 30 includes first and second deployment door panels 32 and 34 which extend over the air bag 14. The deployment door panels 32 and 34 are held in closed positions, as shown in FIG. 1, by a rupturable section 36 of the cover 30. As the inflation gas emitted from the inflator 12 begins to inflate the air bag 14, it moves the air bag 14 forcefully outward against the cover 30. The air bag 14 then ruptures the rupturable section 36 of the cover 30 and moves the deployment door panels 32 and 34 pivotally outward, as shown in FIG. 2. As the inflation gas continues to inflate the air bag 14, it moves the air bag 14 outward from the cover 30 past the deployment door panels 32 and 34. Although the cover 30 is shown as having two deployment door panels 32 and 34, it could alternatively have only a single deployment door panel or more than two deployment door panels.

In the schematic views of FIGS. 1 and 2, air bag 14 is shown to have a major portion 40 and an inlet portion 42. When the air bag 14 is being inflated from the condition of FIG. 1 to the condition of FIG. 2, the major portion 40 of the air bag 14 moves outward from the cover 30 toward the driver of the vehicle. The inlet portion 42 of the air bag 14 is retained within the cover 30 with the inflator 12.

As shown in greater detail in FIG. 3, the inflator 12 has a cylindrical housing 60 with a central axis 61. A circumferentially extending array of gas outlet openings 62 is located near one end of the housing 60. An annular mounting flange 64 projects radially outward at the other end of the housing 60. The flange 64 has upper and lower side surfaces 66 and 68 facing oppositely away from each other along the axis 61. The housing 60, including the mounting flange 64, is formed of a rigid metal material.

Also shown in FIG. 3 is a reaction plate 70 for supporting the inflator 12 in the air bag module 16 (FIGS. 1 and 2). The reaction plate 70 is a unitary part comprising a single piece of stamped metal. An upper portion 72 of the reaction plate 70 has a square peripheral shape with rounded corners. An upper side surface 74 of the upper portion 72 lies in a plane perpendicular to the axis 61 of the inflator housing 60. The upper portion 72 of the reaction plate 70 further has a rectangular array of four mounting apertures 76. A pair of opposed mounting tabs 78 project axially downward, and radially inward, from the upper portion 72 of the reaction plate 70.

Figure 4:
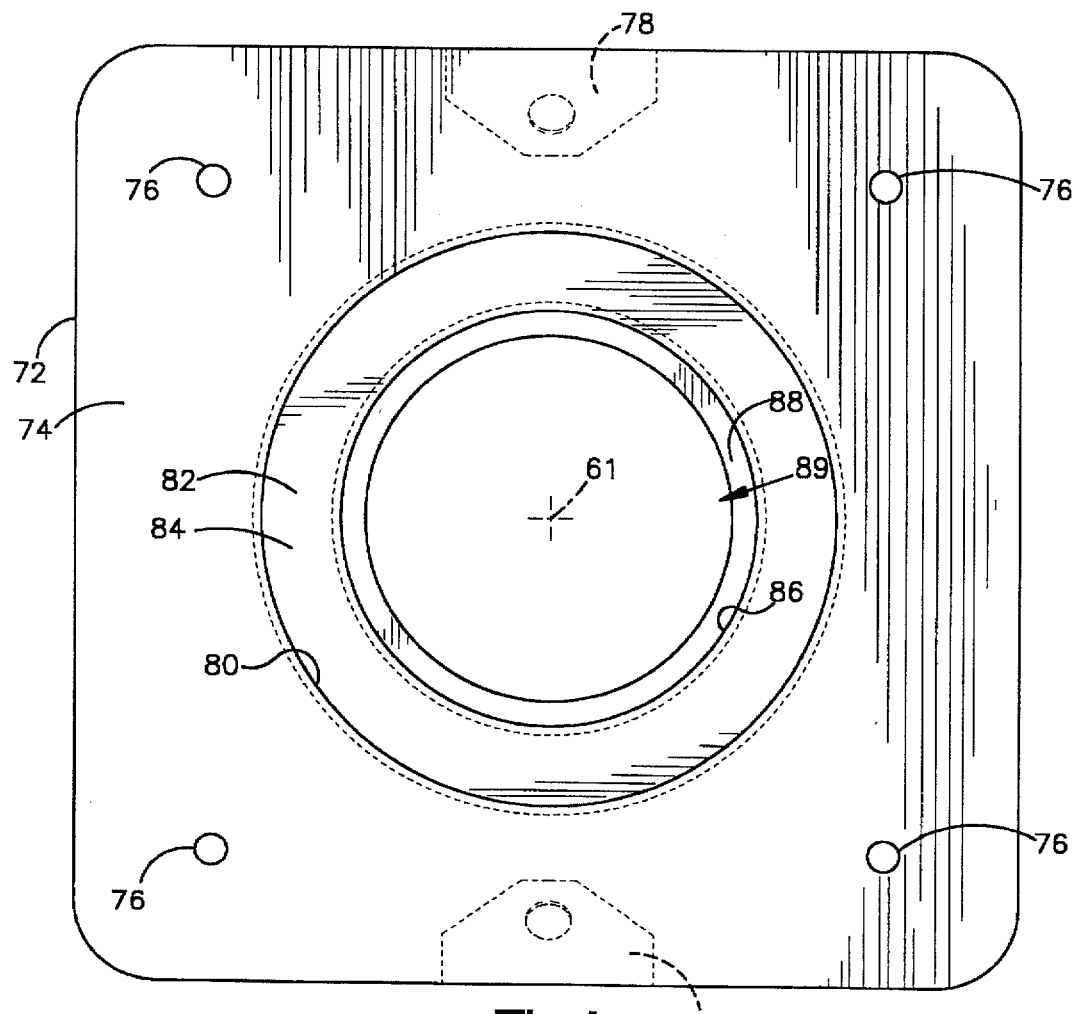
FIG. 4 is a view taken on line 4—4 of FIG. 3.

A short cylindrical portion 80 of the reaction plate 70 is centered on the axis 61, and extends axially downward, as viewed in FIG. 4, from the upper portion 72. An annular shoulder portion 82 of the reaction plate 70 extends radially inward from the cylindrical portion 80, and also is centered on the axis 61. The shoulder portion 82 has an upper side surface 84 in a plane perpendicular to the axis 61. A lower portion 86 of the reaction plate 70 extends axially downward from the shoulder portion 82, and has an annular rim 88 extending a short distance radially inward toward the axis 61. The rim 88 defines a circular central opening 89 which provides access for connection of the inflator 12 in the electrical circuit 20 (FIGS. 1 and 2).

As shown schematically in FIGS. 1 and 2, the air bag module 16 further includes a retainer 100. As shown separately in FIG. 5, the retainer 100 is a unitary, stamped metal part with a planar frame 102 centered on an axis 103. A lower side surface 104 (FIG. 6) of the frame 102 lies in a plane perpendicular to the axis 103. Like the upper portion 72 (FIG. 4) of the reaction plate 70, the frame 102 has a square peripheral shape with rounded corners. However, the frame 102 is substantially smaller, as measured between its opposite side edges, than the upper portion 72 of the reaction plate 70.

An upper flange 105 projects axially upward, as viewed in FIG. 4, from the periphery of the frame 102. A lower flange 106 projects axially downward from the frame 102, and defines a circular central opening 108. Four threaded mounting studs 110 also project axially downward from the frame 102, with each stud 110 being located adjacent to a corresponding one of the four rounded corners of the frame 102. The mounting studs 110 are thus arranged in a rectangular array corresponding to the rectangular array of apertures 76 (FIG. 4) in the upper portion 72 of the reaction plate 70.

The retainer 100 further has a plurality of spring structures 120, one of which is shown fully in FIG. 5. Preferably, the retainer 100 has four such spring structures 120, with each spring structure 120 being located in radial alignment with, i.e., circumferentially adjacent to, a corresponding one of the four mounting studs 110.

Each spring structure 120 includes a tab 122, a slot 124, and a spring arm 126. The tabs 122 project equal distances axially downward from the lower flange 106. Each tab 122 has a lower edge surface 128 in a plane perpendicular to the axis 103. The slots 124 are defined by corresponding inner edge surfaces 130 of the lower flange 106. Each slot 124 is elongated circumferentially about the axis 103, and extends longitudinally past the location of the corresponding tab 122. The spring arms 126 are circumferentially elongated portions of the lower flange 106 that are located axially between the slots 124 and the tabs 122.

Figure 6:
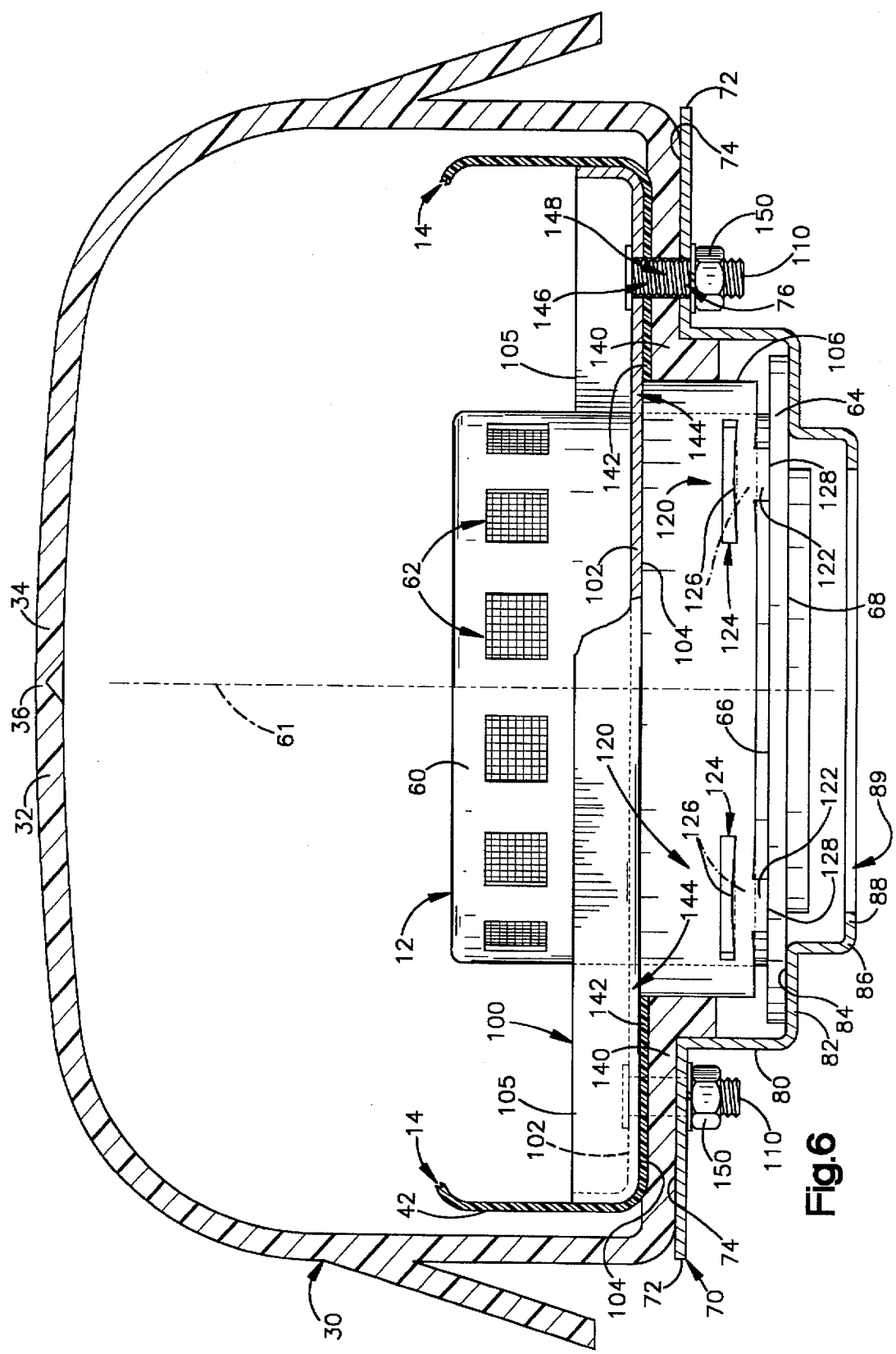
FIG. 6 is a partial side view of the apparatus of FIG. 1 showing several parts in an interconnected relationship.

The foregoing parts of the air bag module 16 are shown in their interconnected relationship in FIG. 6. The inflator 12 and the inlet portion 42 of the air bag 14 are clamped against the reaction plate 70 by the retainer 100. Four mounting flaps 140 on the cover 30, two of which are shown in the side view of FIG. 6, also are clamped against the reaction plate 70 by the retainer 100.

More specifically, the mounting flange 64 on the inflator 12 lies upon the shoulder portion 82 of the reaction plate 70. The inlet portion 42 of the air bag 14 has an edge section 142 defining a circular inlet opening 144. The retainer 100 is received partially within the air bag 14 through the inlet opening 144, with the frame 102 and the upper flange 105 being located inside the air bag 14, and with the lower flange 106 projecting outward from the air bag 14 through the inlet opening 144. The tabs 122 at the bottom of the lower flange 106 stand on the mounting flange 64 on the inflator 12.

The mounting studs 110 on the retainer 100 project outward through apertures 146 in the edge section 142 of the air bag 14. The mounting studs 110 also extend through apertures 148 in the mounting flaps 140 on the cover 30, and further through the apertures 76 in the reaction plate 72. When a corresponding plurality of nuts 150 are tightened onto the mounting studs 110, the frame portion 102 of the retainer 100 is drawn axially downward toward the upper portion 72 of the reaction plate 70 by an axially directed clamping force. This causes the edge section 142 of the air bag 14, as well as the mounting flaps 140 on the cover 30, to become contracted axially between the lower side surface 104 of the retainer 100 and the upper side surface 74 of the reaction plate 70.

When the nuts 150 are tightened onto the mounting studs 110, the resulting clamping force presses the tabs 122 forcefully downward against the mounting flange 64 so as to hold the mounting flange 64 firmly against the shoulder portion 82 of the reaction plate 70. The lower edge surfaces 128 of the tabs 122 are thus pressed against the upper side surface 66 of the mounting flange 64 forcefully enough to deflect the spring arms 126 upward across the slots 124 from the positions shown in dashed lines in FIG. 6 to the positions shown in solid lines in FIG. 6. In this manner, the spring structures 120 are contracted so as to permit the frame 102 to move axially toward the upper portion 72 of the reaction plate 70, as described above. The spring structures 120 remain stressed under the influence of the axially directed clamping force so as to exert a spring bias against the mounting flange 64 as an axially directed reaction force. The mounting tabs 78 on the reaction plate 70 are used with fasteners (not shown) to mount the interconnected parts of FIG. 6 on another part of the air bag module 16, such as a spring-loaded horn switch assembly 156 (FIGS. 1 and 2), in a known manner.

A particular feature of the present invention is shown in the partial view of FIG. 7. In accordance with this feature of the invention, each spring arm 126 has a pair of opposite end portions 160. The opposite end portions 160 have rectangular shapes, and preferably have equal lengths L and equal widths W. The flexibility of the spring arms 126 can be varied by varying the lengths L and the widths W of the opposite end portions 160. For example, the spring arms 126 can be made more flexible by increasing the lengths L and decreasing the widths W. Conversely, the spring arms 126 can be made less flexible by decreasing the lengths L and increasing the widths W.

In a second embodiment of the present invention, a retainer like the retainer 100 has a plurality of alternative spring structures 200, one of which is shown in the partial view of FIG. 8. Like the spring structures 120 described above, the spring structures 200 have circumferentially elongated spring arms 202 located axially between corresponding tabs 204 and slots 206. However, the slots 206 in the spring structures 200 have rounded opposite ends 208, whereas the slots 124 (FIG. 7) in the spring structures 120 have sharp corners at their opposite ends. The spring arms 202 thus have partially curved opposite end portions 210. This reduces the stress concentrations at the opposite end portions 210 upon flexing of the spring arms 202.

In a third embodiment of the present invention, the air bag module 16 includes an alternative retainer 300 (FIG. 9). Like the retainer 100, the retainer 300 is a unitary stamped metal part with a generally square frame 302 centered on an axis 303. An upper flange 305 projects axially upward from the periphery of the frame 302. A lower flange 306 projects axially downward from the frame 302, and defines a circular central opening 308. The retainer 300 further has four mounting studs 310 like the mounting studs 110 described above. However, the retainer 300 has spring structures 320 which differ from the spring structures 120 and 200 described above.

The spring structures 320 comprise flexible spring arms 322 which connect the lower flange 306 with the frame 302. Each spring arm 322 is elongated circumferentially about the central axis 303 and, as best shown in FIG. 10, has a radial profile extending in an arc around a circular line 323. The circular line 323 is centered on, and lies in a plane which is perpendicular to, the central axis 303. In this configuration, the spring arms 322 support the lower flange 306 for movement upward relative to the frame 302 from the position shown in dashed lines in FIG. 10 to the position shown in solid lines in FIG. 10. The lower flange 306 is thus movable against the bias of the spring arms 322 under the influence of a clamping force like the clamping force described above with reference to FIG. 6. Since the retainer 300 does not have tabs like the tabs 122 on the retainer 100, the lower flange 306 has a lower edge surface 324 which abuts the upper side surface 66 (FIG. 4) of the mounting flange 64 on the inflator 12 when the retainer 300 is interconnected with the other parts of the corresponding air bag module.

As further shown in FIG. 9, the frame 302 preferably has four cut-out sections 326 extending circumferentially between the spring structures 320. The cut-out sections 326 reduce the amount of the stamped metal material that must be deflected under the influence of the clamping force. Alternatively, the retainer 300 could be formed without the cut-outs 326. The retainer 300 would then have a single spring arm 322 extending circumferentially entirely around the axis 303.

From the above description of the invention, those skilled in the art will perceive improvements, changes and modifications. Such improvements, changes and modifications within the skill of the art are intended to be covered by the appended claims.

Having described the invention, the following is claimed:
1. Apparatus comprising:
    an inflatable vehicle occupant protection device;
    an inflator having a mounting part;
    a support structure having first and second support surfaces which are spaced from each other; and
    clamping means for holding said protection device and said inflator against said support structure with a clamping force;
    said clamping means comprising a first clamping surface for holding said protection device against said first support surface and a second clamping surface for holding said mounting part of said inflator against said second support surface;
    said clamping means further comprising spring means for flexing to permit said first and second clamping surfaces to move toward each other under the influence of said clamping force upon the application of said clamping force.

2. Apparatus as defined in claim 1 wherein said clamping means comprises a unitary retainer which includes said first clamping surface, said second clamping surface, and said spring means.

3. Apparatus as defined in claim 1 wherein said spring means is located between said first and second clamping surfaces and is contracted between said first and second clamping surfaces under the influence of said clamping force.

4. Apparatus as defined in claim 1 wherein said first and second clamping surfaces are portions of a unitary retainer, said spring means comprising a flexible portion of said retainer which moves across an adjacent slot upon flexing under the influence of said clamping force.

5. Apparatus as defined in claim 4 wherein said spring means further comprises a tab which projects from said flexible portion of said retainer in a direction away from said slot, said second clamping surface being an edge surface of said tab.

6. Apparatus as defined in claim 5 wherein said slot has a rectangular peripheral shape.

7. Apparatus as defined in claim 5 wherein said slot has an elongated shape with circular opposite end portions.

8. Apparatus as defined in claim 5 wherein said tab, said slot, and said flexible portion of said retainer together define one of a plurality of spring structures.

9. Apparatus as defined in claim 1 wherein said first and second clamping surfaces are portions of a retainer which are spaced from each other along an axis, said spring means comprising a flexible portion of said retainer having a cross-sectional configuration extending in an arc around a circular line which is centered on, and located in a plane perpendicular to, said axis.

10. Apparatus as defined in claim 9 wherein said flexible portion of said retainer is elongated circumferentially about said axis.

11. Apparatus as defined in claim 9 wherein said flexible portion of said retainer is one of a plurality of flexible portions of said retainer which are spaced from each other circumferentially about said axis.

12. Apparatus as defined in claim 1 further comprising a cover for said protection device, said clamping means holding said cover against said support structure with said clamping force.

13. Apparatus as defined in claim 12 wherein said cover has at least one mounting portion clamped between said first clamping surface and said first support surface.

14. Apparatus comprising:

an inflatable vehicle occupant protection device having an edge portion defining an inlet opening;

a cover for said protection device, said cover having at least one mounting flap;

an inflator having a cylindrical housing with a central axis and a mounting flange projecting radially from said housing, said housing extending axially through said inlet opening;

a reaction plate having first and second support surfaces spaced from each other along said central axis; and a retainer extending circumferentially around said housing, said retainer comprising means for holding said protection device, said cover, and said inflator against said reaction plate with an axially directed clamping force;

said retainer comprising a first clamping surface for holding said edge portion of said protection device and said mounting flap axially against said first support surface, a second clamping surface for holding said mounting flange axially against said second support surface, and spring means for flexing to permit said first and second clamping surfaces to move axially toward each other under the influence of said clamping force upon the application of said clamping force.

15. Apparatus as defined in claim 14 wherein said spring means comprises a flexible portion of said retainer which moves across an adjacent slot upon flexing under the influence of said clamping force.

16. Apparatus as defined in claim 15 wherein said spring means further comprises a tab which projects from said flexible portion of said retainer in a direction away from said slot, said second clamping surface being an edge surface of said tab.

17. Apparatus as defined in claim 16 wherein said slot has a rectangular peripheral shape.

18. Apparatus as defined in claim 16 wherein said slot has an elongated shape with circular opposite end portions.

19. Apparatus as defined in claim 16 wherein said tab, said slot, and said flexible portion of said retainer together define one of a plurality of spring structures which are spaced from each other circumferentially about said central axis.

20. Apparatus as defined in claim 14 wherein said first and second clamping surfaces are spaced from each other along said central axis, said spring means comprising a flexible portion of said retainer having a cross-sectional configuration extending in an arc around a circular line which is centered on, and located in a plane perpendicular to, said central axis.

21. Apparatus as defined in claim 20 wherein said flexible portion of said retainer is elongated circumferentially about said central axis.

22. Apparatus as defined in claim 21 wherein said flexible portion of said retainer is one of a plurality of flexible portions of said retainer which are spaced from each other circumferentially about said central axis.

* * * * *